United States Patent
Inaba

(10) Patent No.: US 12,165,381 B2
(45) Date of Patent: Dec. 10, 2024

(54) APPARATUS, METHOD, AND STORAGE MEDIUM

(71) Applicant: CANON KABUSHIKI KAISHA, Tokyo (JP)

(72) Inventor: Midori Inaba, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 363 days.

(21) Appl. No.: 17/540,112

(22) Filed: Dec. 1, 2021

(65) Prior Publication Data

US 2022/0189137 A1    Jun. 16, 2022

(30) Foreign Application Priority Data

Dec. 10, 2020    (JP) .................................. 2020-204919

(51) Int. Cl.
| | | |
|---|---|---|
| *G06V 10/00* | (2022.01) | |
| *G06T 9/00* | (2006.01) | |
| *G06V 10/60* | (2022.01) | |

(52) U.S. Cl.
CPC ................ *G06V 10/60* (2022.01); *G06T 9/00* (2013.01)

(58) Field of Classification Search
CPC ......... G06V 10/60; G06T 9/00; G06T 15/506; H04N 19/60; H04N 19/80; H04N 19/85
See application file for complete search history.

(56) References Cited

U.S. PATENT DOCUMENTS

2018/0370255 A1* 12/2018 Kubo ................. G06K 15/1868

FOREIGN PATENT DOCUMENTS

| WO | 2018123801 A1 | 7/2018 | |
| WO | WO-2020181360 A1 * | 9/2020 | ............. G06T 15/06 |

OTHER PUBLICATIONS

Alexander Wong, et al.; "Adaptive Normal Map Compression for 3D Video Games;" Department of Electrical and Computer Engineering; University of waterloo; Waterloo, Ontario, Canada, N2L3G1; Jan. 1, 2006; pp. 1-8.
Jacob Munkberg, et al.; "Tight Frame Normal Map Compression;" Association For Computing Machinery, Inc.; Jan. 1, 2007; pp. 1-5.
J. Stachera et al.; "Normal Map Compression Based on BTC and Wavelet Coding;" Proc. Of SPIE-IS & T Electronic Imaging, SPIE vol. 6811; Feb. 26, 2008; pp. 68110S-1-68110S-8.

* cited by examiner

*Primary Examiner* — Ping Y Hsieh
*Assistant Examiner* — Xiao Liu
(74) *Attorney, Agent, or Firm* — Canon U.S.A., Inc. IP Division

(57) ABSTRACT

An apparatus includes an acquisition unit to acquires normal information indicating a normal direction on a surface of an object and specular reflection information regarding reflection on the object in a specular reflection direction, and a compression unit to compress the normal information based on the specular reflection information and to perform a higher compression process for a lower specular reflection intensity on the object.

16 Claims, 14 Drawing Sheets

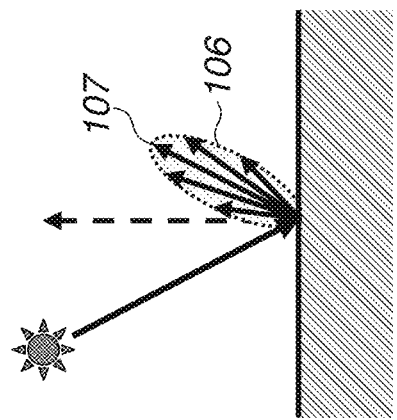
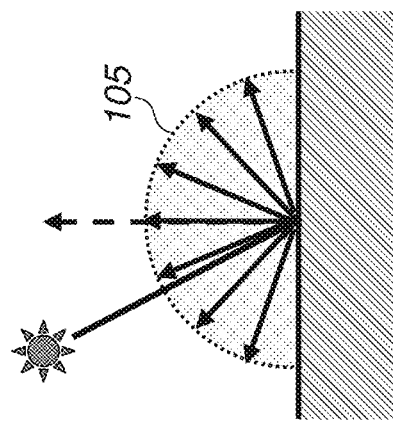
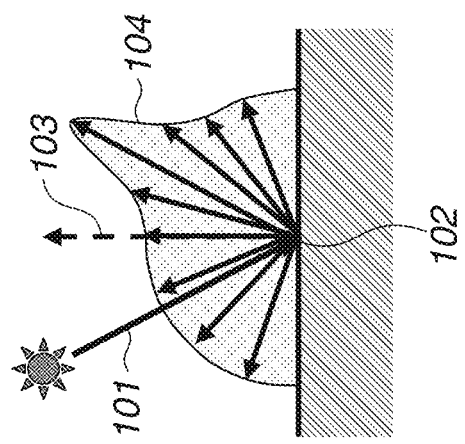
FIG.1

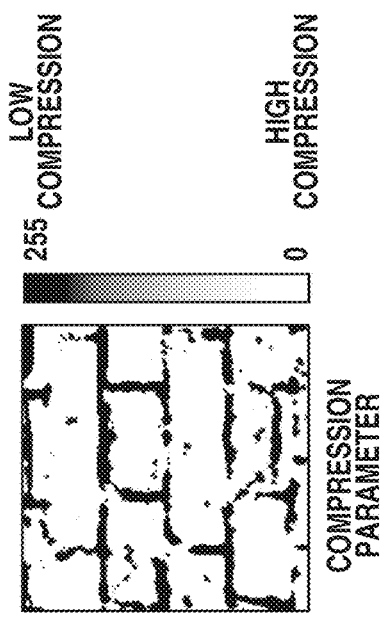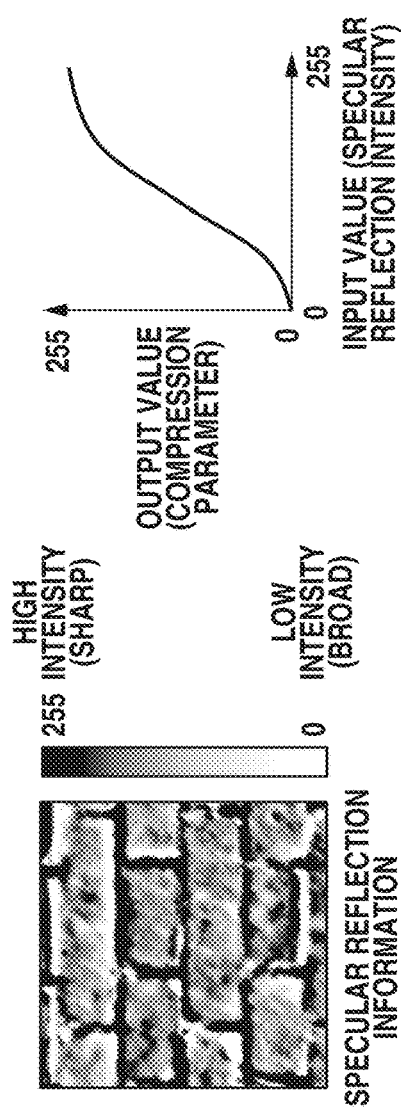

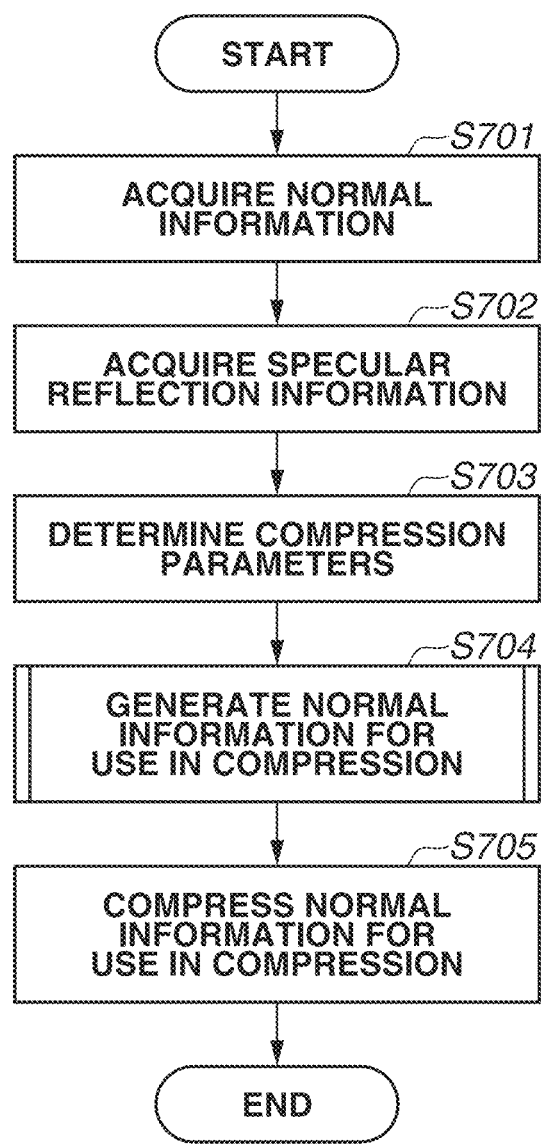

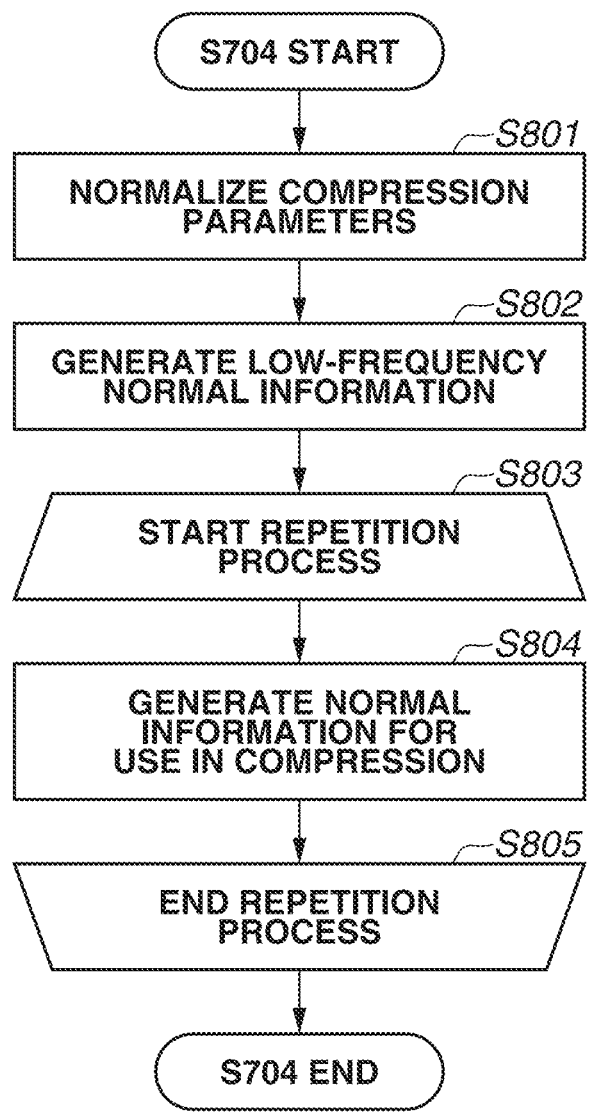

FIG.13
| | SPECULAR REFLECTION INTENSITY IS ENTIRELY HIGH | SPECULAR REFLECTION INTENSITY IS ENTIRELY LOW |
|---|---|---|
| UNCOMPRESSED | 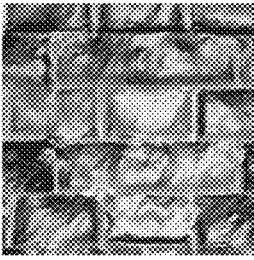 1301 | 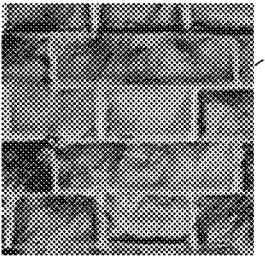 1302 |
| LOW COMPRESSION (COMPRESSION LEVEL 10) | 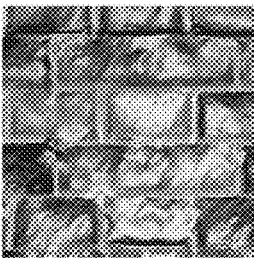 1303 | 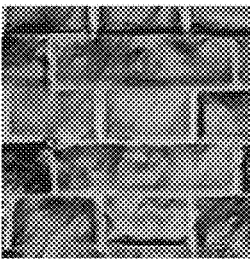 1304 |
| HIGH COMPRESSION (COMPRESSION LEVEL 2) | 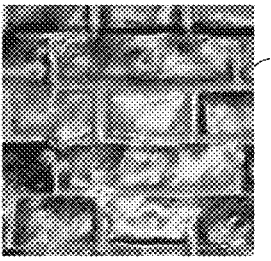 1305 | 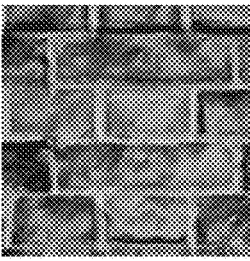 1306 |

APPARATUS, METHOD, AND STORAGE MEDIUM

BACKGROUND OF THE DISCLOSURE

Field of the Disclosure

The aspect of the embodiments relates to a technique for compressing data regarding the material appearance of an object.

Description of the Related Art

In order to reproduce the appearances of material and coating of an object, measurement data of reflection characteristics in accordance with an illumination direction and observation direction is used. Reflection characteristic data generally includes information regarding diffuse reflection and/or specular reflection on an object, information on fine asperities on the surface of the object, and the like, and is characterized in that its data amount is larger than that of still image data. As a data compression technique, WO 2018/123801 discusses a technique for compressing a depth image by a two-dimensional image compression method.

Each piece of information included in the reflection characteristic data correlates with one another and affects the appearance of the object. Thus, if these pieces of information are separately subjected to such a compression process as discussed in WO2018/123801, the material appearance of the object represented by the reflection characteristic data may significantly become degraded.

SUMMARY OF THE DISCLOSURE

According to an aspect of the embodiments, an apparatus includes an acquisition unit configured to acquire normal information indicating a normal direction on a surface of an object and specular reflection information regarding reflection on the object in a specular reflection direction, and a compression unit configured to compress the normal information based on the specular reflection information.

Further features of the disclosure will become apparent from the following description of exemplary embodiments with reference to the attached drawings.

BRIEF DESCRIPTION OF THE DRAWINGS

FIG. 1 is a diagram illustrating reflection characteristics of an object.

FIGS. 6A to 6C are diagrams illustrating a process of determining a compression parameter.

FIG. 7 is a flowchart of a process which is executed by the information processing apparatus.

FIG. 8 is a flowchart of a process of generating normal information for use in compression.

FIG. 13 is a diagram illustrating examples of results of rendering of normal information.

DESCRIPTION OF THE EMBODIMENTS

Figure 2:
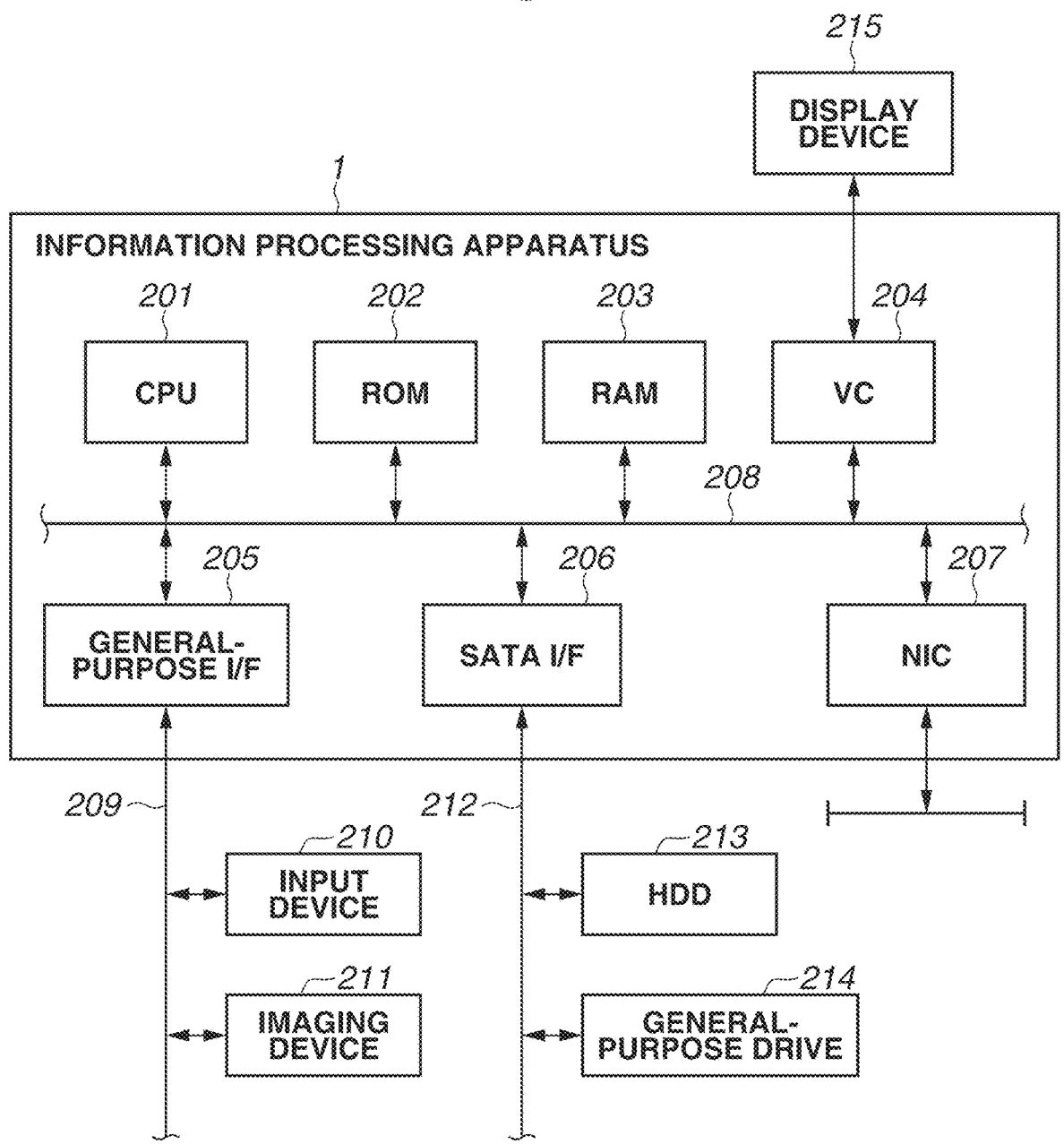
FIG. 2 is a diagram illustrating a hardware configuration of an information processing apparatus.

Hereinafter, exemplary embodiments will be described with reference to the accompanying drawings. The following exemplary embodiments are not intended to limit the disclosure, and all of combinations of features described in relation to the exemplary embodiments are not necessarily essential to the solutions of the disclosure.

In the present exemplary embodiment, a process for reducing an amount of reflection characteristic data including specular reflection information, diffusion reflection information, and normal information, which is information about a normal, is performed. Specifically, based on the specular reflection information, a compression parameter to be used in the compression of the normal information is determined, and the normal information is compressed on the basis of the compression parameter. Initially, the reflection characteristics of an object will be described with reference to FIG. 1. FIG. 1 illustrates intensity 104 of reflection light in a case where light is applied from the position of a light source 101 to a point 102 on the surface of the object corresponding to a normal direction 103. The light reflected on the surface of the object can be divided into a diffusion reflection component 105 and a specular reflection component 106. The diffusion reflection component 105 is a reflection component corresponding to the outgoing light toward the outside of the object resulting from irregular reflection of the incident light inside the object, and the diffusion reflection component 105 is observed at a substantially uniform intensity in every direction. The specular reflection component 106 is a reflection component corresponding to the light resulting from specular reflection of the incident light on the surface of the object, and the specular reflection component 106 is visually recognized by an observer as a gloss on the surface of the object. The specular reflection component 106 has an intensity peak in a direction opposite to the direction in which light is emitted from the light source 101 with reference to the normal direction. Hereinafter, a reflection intensity 107 in a direction in which the intensity of the specular reflection component 106 is highest will be called specular reflection intensity.

Hardware Configuration of the Information Processing Apparatus

FIG. 2 is a block diagram illustrating a hardware configuration of an information processing apparatus 1. The information processing apparatus 1 includes a central processing unit (CPU) 201, a read only memory (ROM) 202, and a random access memory (RAM) 203. The information processing apparatus 1 also includes a video card (VC) 204, a general-purpose interface (I/F) 205, a serial Advanced Technology Attachment (SATA) I/F 206, and a network interface card (NIC) 207. The CPU 201 executes the operating system (OS) and various programs stored in the ROM 202 or a hard disk drive (HDD) 213, with the RAM 203 serving as a work memory. The CPU 201 controls each components via a system bus 208. The processes in the flowcharts described below are executed by the CPU 201 loading program codes stored in the ROM 202 and/or the HDD 213 into the RAM 203. A display device 215 is connected to the VC 204. An input device 210, such as a mouse and a keyboard, and an imaging device 211 are connected to the general-purpose I/F 205 via a serial bus 209. The HDD 213 and a general-purpose drive 214 which reads and writes various recording media are connected to the SATA I/F 206 via a serial bus 212. The NIC 207 inputs and outputs information into and from an external device. The CPU 201 uses various recording media mounted in the HDD 213 or the general-purpose drive 214 as storage locations for various data. The CPU 201 displays a user interface (UI) provided by a program on the display device 215, and receives user instructions input via the input device 210. The display device 215 may be a touch panel display that has a touch panel function with which the position of a touch by an indicator, such as a finger, is detected.

Functional Configuration of the Information Processing Apparatus

Figure 3:
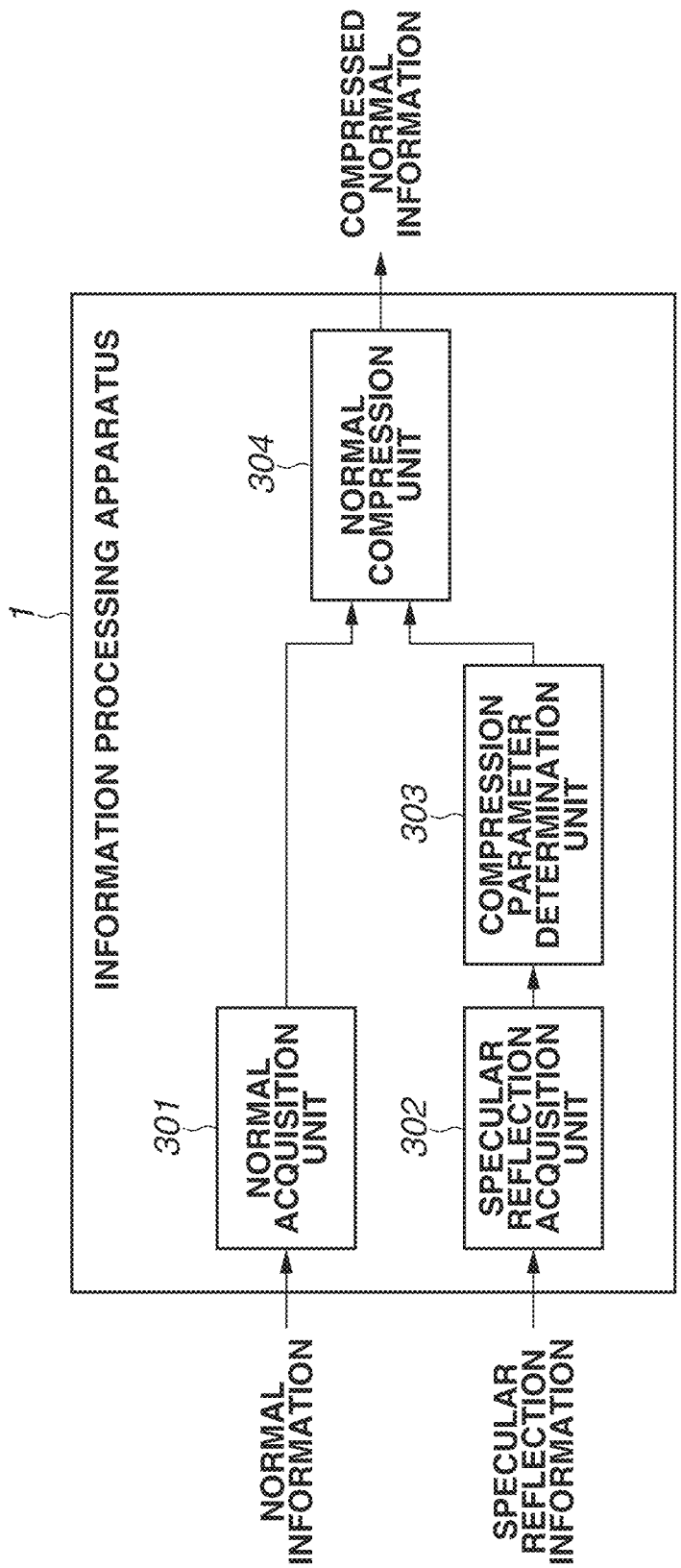
FIG. 3 is a diagram illustrating a functional configuration of the information processing apparatus.

FIG. 3 is a diagram illustrating a functional configuration of the information processing apparatus 1. The CPU 201 serves as functional components illustrated in FIG. 3 by reading the programs stored in the ROM 202 or the HDD 213 and executing the read programs, with the RAM 203 serving as a work memory. All the processes described below do not necessarily need to be executed by the CPU 201, and the information processing apparatus 1 may be configured to perform some or all of the processes by one or more processing circuits other than the CPU 201.

The information processing apparatus 1 has a normal acquisition unit 301, a specular reflection acquisition unit 302, a compression parameter determination unit 303, and a normal compression unit 304. The normal acquisition unit 301 acquires normal information indicating a two-dimensional distribution of normal direction on the surface of an object. More specifically, the normal acquisition unit 301 acquires the normal information from a storage device, such as the HDD 213. The normal information in the present exemplary embodiment is two-dimensional data having normal vectors ($N_X$, $N_Y$, and $N_Z$) for each pixel, and the respective values of ($N_X$, $N_Y$, and $N_Z$) are expressed by eight bits.

The specular reflection acquisition unit 302 acquires specular reflection information indicating a two-dimensional distribution of specular reflection intensity on the object. Specifically, the specular reflection acquisition unit 302 acquires the specular reflection information from a storage device, such as the HDD 213. The specular reflection information in the present exemplary embodiment is two-dimensional data having specular reflection intensity for each pixel, and the specular reflection intensity is expressed by eight bits. The specular reflection intensity here is equivalent to a parameter $\alpha$ indicating the level of gloss of a Phong model. For example, in a case where the pixel value is 255, the specular reflection intensity is the highest and a highlight generated in the area of specular reflection to the observer has a small area and high intensity. In a case where the pixel value is zero, the specular reflection intensity is the lowest, and a highlight has a large area and low intensity. In the present exemplary embodiment, it is assumed that both the normal information and the specular reflection information have a size of 128×128 pixels and a resolution of 150 dpi.

Figure 5A:
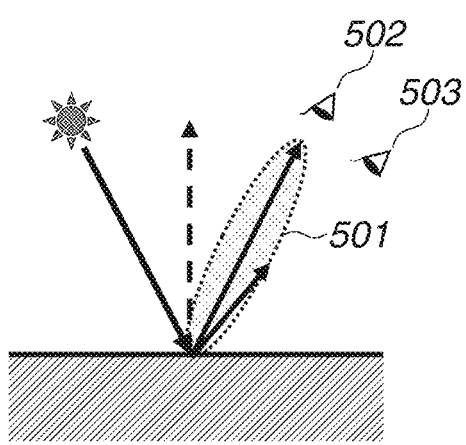
FIGS. 5A and 5B are diagrams illustrating the relationship between specular reflection intensity and normal direction.
Figure 5B:
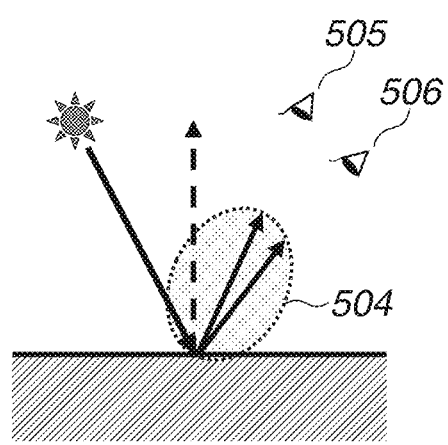

The compression parameter determination unit 303 determines a compression parameter to be used in compression of the normal information, based on the specular reflection information. The compression parameter is determined for each area of the object in accordance with the specular reflection intensity. The relationship between the specular reflection intensity and the normal direction will be described with reference to FIGS. 5A and 5B. FIG. 5A illustrates a specular reflection component 501 with a high specular reflection intensity. Observations of the specular reflection component 501 at an observation position 502 and at an observation position 503 will be considered. The specular reflection component 501 observed at the observation position 503 slightly shifted from the observation position 502 in the specular reflection direction is significantly smaller than the specular reflection component 501 observed at the observation position 502. This indicates that, with a high specular reflection intensity, the specular reflection component has a sharp shape and highly depends on the observation position and the angle with respect to the normal direction. FIG. 5B illustrates a specular reflection component 504 with a low specular reflection intensity. Observations of the specular reflection component 504 at an observation position 505 and at an observation position 506 will be considered. The difference between the specular reflection component 504 observed at the observation position 505 in the specular reflection direction and the specular reflection component 504 observed at the observation position 506 slightly shifted from the observation position 505 is small. This indicates that, with a low specular reflection intensity, the specular reflection component has a broad shape and does not highly depend on the observation position and the angle with respect to the normal direction. In other words, even if the normal direction is somewhat changed from a position at which the specular reflection intensity is low or the specular reflection component has a broad shape, the influence of the change is small and thus the influence of compressing the normal information can also be considered to be small.

In view of the above, the compression parameter determination unit 303 applies an S-shaped gamma curve to the specular reflection information to determine a compression parameter. FIGS. 6A to 6C are diagrams illustrating a process of determining a compression parameter. FIG. 6A illustrates specular reflection information. FIG. 6B illustrates a gamma curve for converting the specular reflection information into a compression parameter. FIG. 6C illustrates an example of a compression parameter for each area determined by applying the gamma curve illustrated in FIG. 6B. The compression parameter takes on an eight bit value, and compression information in an image format having a compression parameter for each pixel is generated. In the present exemplary embodiment, the highest-compression process is performed in a case where a compression parameter value is zero, and the lowest-compression process is performed in a case where a compression parameter value is 255. The normal compression unit 304 compresses the normal information based on the determined compression parameters.

<Process Executed by the Information Processing Apparatus>

Processing that is executed by the information processing apparatus 1 in the present exemplary embodiment will be described with reference to the flowchart of FIG. 7. The processing illustrated in the flowchart of FIG. 7 is started when the user inputs an instruction via the input device 210 and the CPU 201 receives the input instruction. In step S701, the normal acquisition unit 301 acquires normal information from a storage device, such as the HDD 213. In step S702, the specular reflection acquisition unit 302 acquires the specular reflection information from the storage device, such as the HDD 213. In step S703, the compression parameter determination unit 303 determines the compression parameter based on the specular reflection information.

In step S704, the normal compression unit 304 generates normal information for use in compression based on the normal information. Specifically, the normal compression unit 304 converts the normal information into normal information for use in compression so that the areas with low specular reflection intensities are to be highly compressed. FIG. 8 is a flowchart illustrating processing of generating the normal information for use in compression. In step S801, the normal compression unit 304 normalizes the compression parameter for each area. More specifically, the normal compression unit 304 divides each pixel value in the compression information by 255 to normalize each pixel value into a value within a range of 0.0 to 1.0. The compression information having the normalized compression parameter for each pixel is regarded as normalized compression information.

In step S802, the normal compression unit 304 applies a known median filter to the normal information to generate low-frequency normal information. The size of the media filter in the present exemplary embodiment is 5×5 pixels. In step S803, the normal compression unit 304 starts a repetition process of generating the normal information for use in compression for each pixel. In step S804, the normal compression unit 304 derives compression normal vectors ($N_X'$, $N_Y'$, and $N_Z'$) for each pixel based on the normalized compression information and the low-frequency normal information. More specifically, the normal compression unit 304 derives the compression normal vectors ($N_X'$, $N_Y'$, and $N_Z'$) in accordance with Equations (1) to (3) described below.

$$N_X'(i,j)=P_N(i,j)\times N_X(i,j)+(1-P_N(i,j))\times N_{XLow}(i,j) \quad \text{(Equation 1)}$$

$$N_Y'(i,j)=P_N(i,j)\times N_Y(i,j)+(1-P_N(i,j))\times N_{YLow}(i,j) \quad \text{Equation (2)}$$

$$N_Z'(i,j)=P_N(i,j)\times N_Z(i,j)+(1-P_N(i,j))\times N_{ZLow}(i,j) \quad \text{Equation (3)}$$

In Equations (1) to (3), $N_X'(i, j)$ is $N_X'$ at a pixel position (i, j), j) is $N_Y'$ at the pixel position (i, j), and $N_Z'(i, j)$ is $N_Z'$ at the pixel position (i, j). $P_N(i, j)$ is a normalized compression parameter at the pixel position (i, j). $N_X(i, j)$ is $N_X$ at the pixel position (i, j), $N_Y(i, j)$ is $N_Y$ at the pixel position (i, j), and $N_Z(i, j)$ is $N_Z$ at the pixel position (i, j). $N_{XLow}(i, j)$ is an X component of the low-frequency normal vectors at the pixel position (i, j). $N_{YLow}(i, j)$ is a Y component of the low-frequency normal vectors at the pixel position (i, j). $N_{ZLow}(i, j)$ is a Z component of the low-frequency normal vectors at the pixel position (i, j).

Equations (1) to (3) are used for compositing the normal vector and the low-frequency normal vector with the normalized compression parameter as a ratio. In a case where the normalized compression parameter is large, in other words, in a case where the normalized compression parameter is a parameter for low compression, the ratio of the normal vector including a high-frequency component to the low-frequency normal vector becomes high. In a case where the normalized compression parameter is small, in other words, in a case where the normalized compression parameter is a parameter for high compression, the ratio of the low-frequency normal vector to the normal vector becomes high. Accordingly, the normal vectors in areas to be highly compressed have a high ratio of low-frequency components. This is because, in the compression method to be used in step S705 (described below), the more low-frequency components are included, the higher compression is performed. In step S805, the normal compression unit 304 ends the repetition process.

In step S705, the normal compression unit 304 performs a compression process on the normal information for use in compression. The compression process is performed using a known JPEG compression method. As described above, in the JPEG compression method, the more low-frequency components are included, the higher compression is performed.

Beneficial Effects of the First Exemplary Embodiment

As described above, the information processing apparatus in the present exemplary embodiment acquires the normal information indicating the normal direction on the surface of an object and the specular reflection information regarding the reflection on the object in the specular reflection direction, and compresses the normal information based on the specular reflection information. This enables reduction in the amount of the reflection characteristic data while controlling degradation in the material appearance of the object represented by the reflection characteristic data. Hereinafter, beneficial effects of the present exemplary embodiment will be described using a specific example. Differences between the normal information compressed through the JPEG compression process and the normal information compressed through the processing according to the present exemplary embodiment will be described with reference to FIG. 4.

Figure 4:
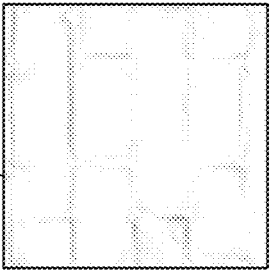
FIG. 4 is a diagram illustrating examples of results of rendering of normal information.

Referring now to FIG. 4, an image 401 is a result of rendering of uncompressed normal information Images 402, 403, and 404 are respective results of rendering of an X component, Y component, and Z component of the uncompressed normal information. An image 405 is a result of rendering of the normal information compressed through the JPEG compression process. Images 406, 407, and 408 are respective results of rendering of the X component, Y component, and Z component of the normal information compressed through the JPEG compression process. The JPEG compression level for the image 405 is set to two. An image 409 is a result of rendering of the normal information compressed through the process according to the present exemplary embodiment. Images 410, 411, and 412 are respective results of rendering of the X component, Y component, and Z component of the normal information compressed through the process according to the present exemplary embodiment. The JPEG compression level for the image 409 is also set to two. If positions a (center portions of low-gloss bricks) indicated in the images 401, 405, and 409 are focused, it can be seen that the images 405 and 409 have lost high-frequency components. If positions b (high-gloss joint portions) are focused, it can be seen that the image 409 expresses specular reflection better than the image 405 and that degradation in the material appearance of the object due to the compression process can be controlled.

Figure 9:
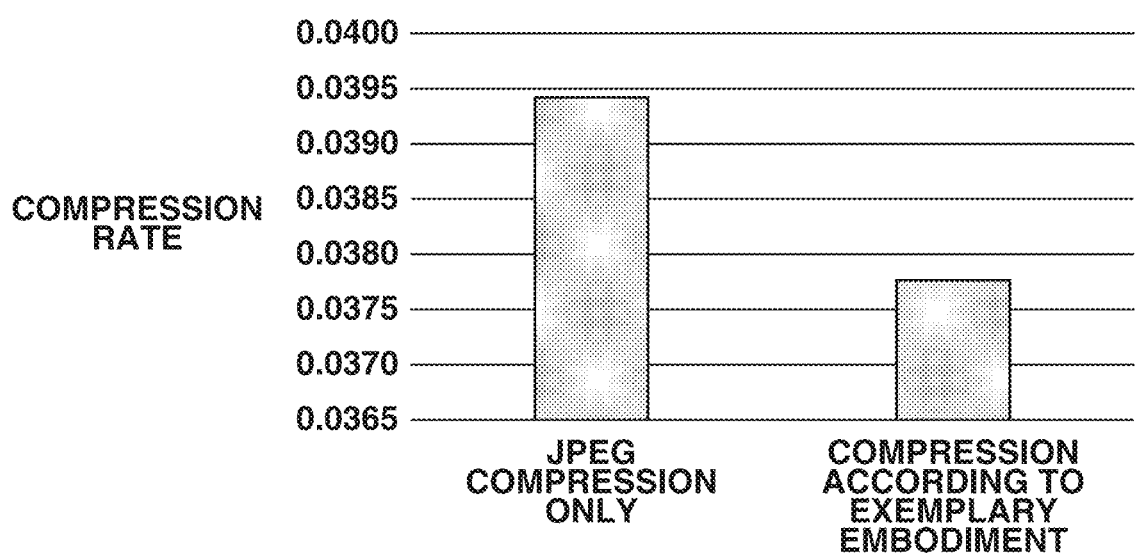
FIG. 9 is a diagram illustrating examples of compression rates.

Differences in compression rate between the JPEG compression process alone and the process of the present exemplary embodiment will be described with reference to FIG. 9. The compression rate in the present exemplary embodiment is derived with a data capacity of the normal information before the compression process set to 1.0, and a lower value indicates higher compression. In other words, the smaller the value of the compression rate, the smaller the size of the compressed file, and the larger the value of the compression rate, the larger the size of the compressed file. FIG. 9 indicates that the compression rate is lower in the compression process according to the present exemplary embodiment than in the case of the JPEG compression process alone. This is because the proportion of the low-frequency component of the normal information is increased before the compression process. In other words, it can be seen that higher compression is performed in the process according to the present exemplary embodiment than in the JPEG compression process alone, and that a larger effect of reducing the data amount is produced.

Modification Examples

While, in the present exemplary embodiment, the compression process based on the specular reflection information is performed on the normal information, reflection characteristic data may be acquired and the information included in the reflection characteristic data may be subjected to a compression process in addition to the compression process based on the specular reflection information. In an embodiment, the reflection characteristic data is to include at least information regarding reflection in the specular reflection direction and information with which the orientation of the surface of an object is determinable. While the information regarding reflection in the specular reflection direction in the present exemplary embodiment includes specular reflection intensity for each pixel (specular map), the information may be a substance map, a gloss map, or a roughness map. Moreover, the information may be data including parameters for a physical base model, such as a Cook-Torrance model. While the information with which the orientation of the surface of an object is determinable in the present exemplary embodiment is the normal information with normal vectors in each pixel (normal map), the information may be a height map, a bump map, a depth map, a displacement map, or the like. In the case of using data other than the normal map, the process according to the present exemplary embodiment described above can be implemented by adding a conversion unit that converts the data into the normal information to the functional configuration of the information processing apparatus 1.

While the compression parameters are determined by applying the S-shaped gamma curve to the specular reflection information in the present exemplary embodiment, the compression parameters may be determined by any other processes through which the compression parameters can be controlled depending on whether the shape of the specular reflection component is sharp or broad.

In the present exemplary embodiment, the compression parameter is determined in accordance with the specular reflection intensity of each pixel. Alternatively, the compression parameter may be determined for each specified area of 8×8 pixels or so.

In the present exemplary embodiment, the low-frequency normal information is generated using a median filter. Alternatively, the low-frequency normal information may be generated using other lowpass-filters, or the low-frequency normal information may be generated by performing conversion into a frequency space using a fast Fourier transformation (FFT) or the like and then removing high-frequency components.

The size, resolution, bit depth, and format of the data are not limited to those described above.

A second exemplary embodiment of the disclosure will be described below. In the first exemplary embodiment, the composite ratio between the normal vector and the low-frequency normal vector is derived as the compression parameter. In the present exemplary embodiment, the compression level in the JPEG compression is derived as a compression parameter. The hardware configuration of an information processing apparatus in the present exemplary embodiment is equivalent to that in the first exemplary embodiment, and thus duplicated description thereof will be omitted. Hereinafter, mainly differences between the present exemplary embodiment and the first exemplary embodiment will be described. The components identical to those of the first exemplary embodiment will be denoted with identical reference signs.

<Functional Configuration of the Information Processing Apparatus>

Figure 10:
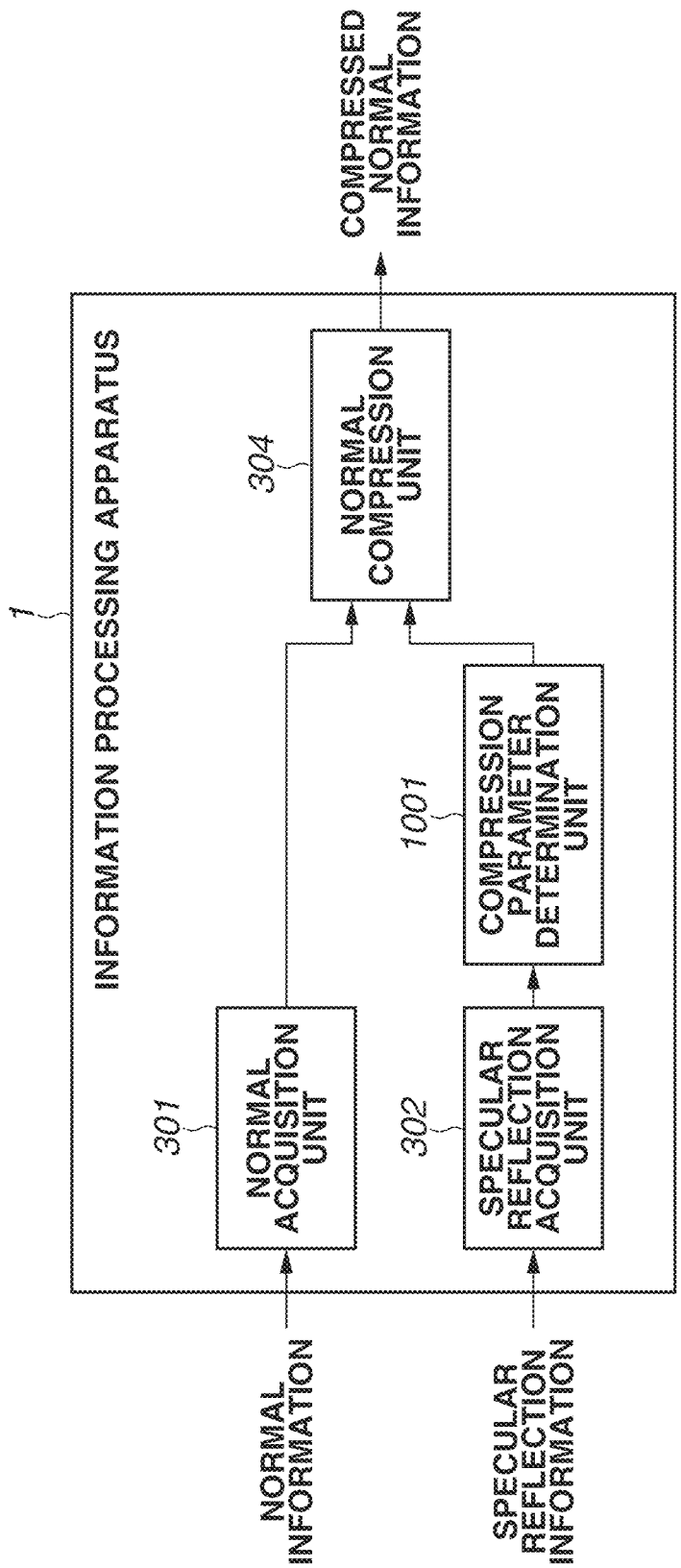
FIG. 10 is a diagram illustrating a functional configuration of the information processing apparatus.

FIG. 10 is a block diagram illustrating a functional configuration of the information processing apparatus 1. A CPU 201 functions as the functional configuration illustrated in FIG. 10 by reading programs stored in a ROM 202 or an HDD 213 and executing the read programs with a RAM 203 serving as a work memory. All of the processes described below do not necessarily need to be executed by the CPU 201. The information processing apparatus 1 may be configured such that some or all of the processes are performed by one or more processing circuits other than the CPU 201.

Figure 11:
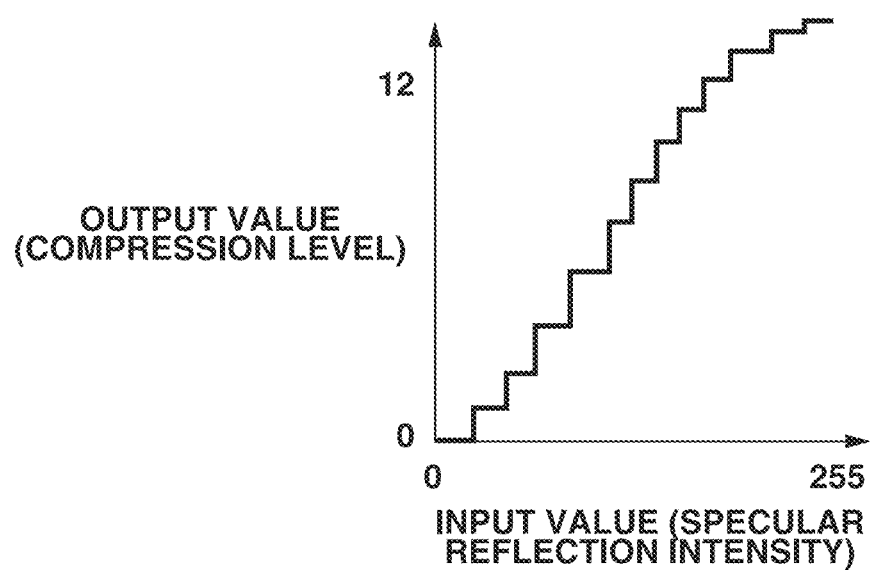
FIG. 11 is a diagram illustrating an example of a correspondence relationship held by a conversion table.

The information processing apparatus 1 has a normal acquisition unit 301, a specular reflection acquisition unit 302, a compression parameter determination unit 1001, and a normal compression unit 304. The compression parameter determination unit 1001 determines a compression parameter based on specular reflection information. More specifically, the compression parameter determination unit 1001 derives a median value as a representative value of specular reflection intensity included in the specular reflection information, and converts the median value of the specular reflection intensity into a compression level using a pre-created conversion table. FIG. 11 illustrates an example of a conversion table holding the correspondence relationship between the representative value of specular reflection intensity and the compression level. The compression level is set to an integer from 12 indicating low compression to zero indicating high compression.

<Process Executed by the Information Processing Apparatus>

Figure 12:
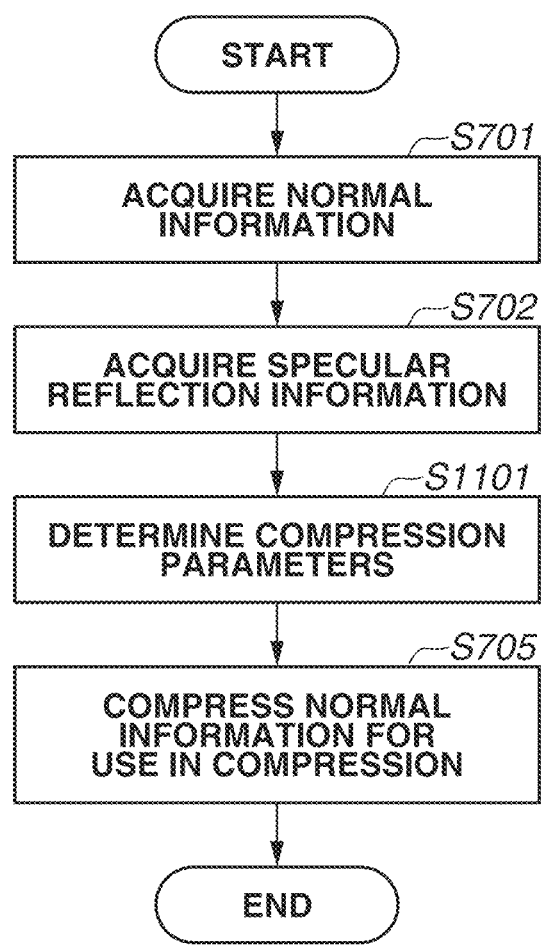
FIG. 12 is a flowchart of a process which is executed by the information processing apparatus.

Processing that is executed by the information processing apparatus 1 in the present exemplary embodiment will be described with reference to the flowchart of FIG. 12. The processing illustrated in the flowchart of FIG. 12 is started when the user inputs an instruction via an input device 210 and the CPU 201 receives the input instruction. Operations in steps S701, S702, and S705 are equivalent to those in the first exemplary embodiment and thus duplicated description thereof will be omitted.

In step S1101, the compression parameter determination unit 1001 determines the compression level for compressing the normal information based on the specular reflection information. The compression level determined in step S1101 is used in the compression process in step S705.

Beneficial Effects of the Second Exemplary Embodiment

Figure 14:
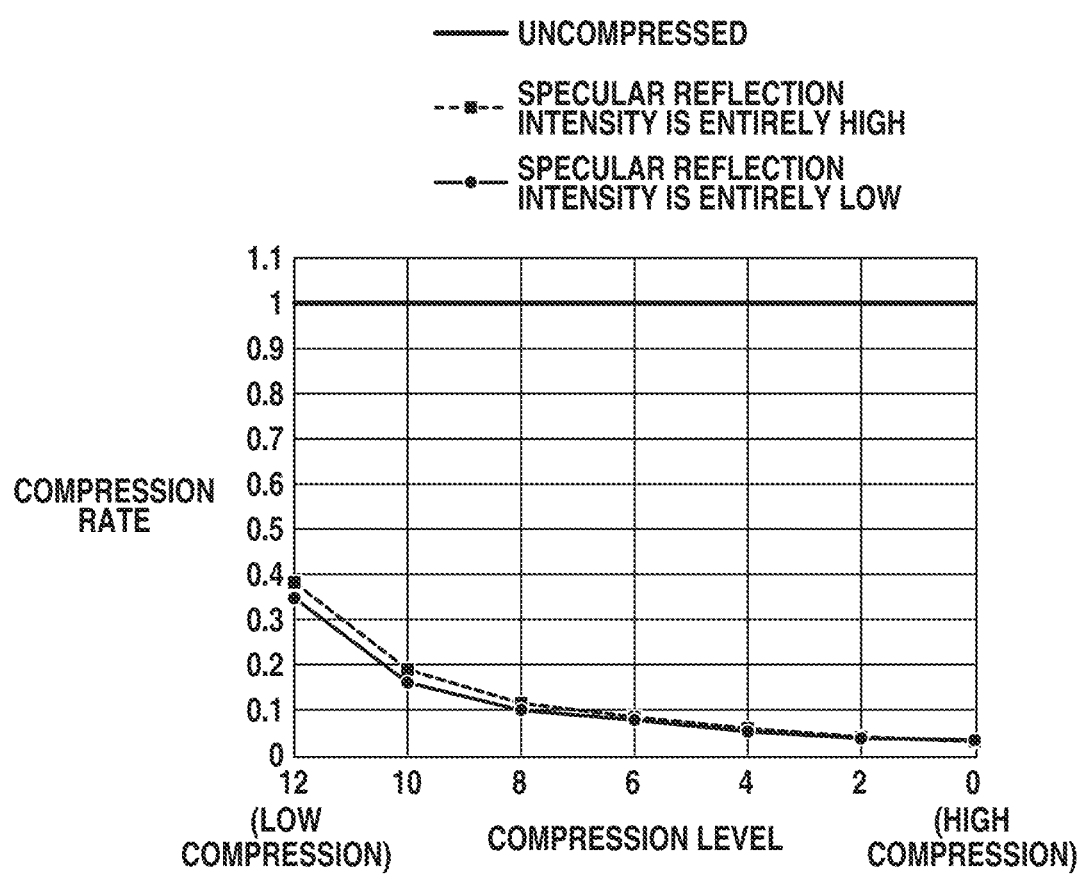
FIG. 14 is a diagram illustrating examples of compression rates.

As described above, the information processing apparatus in the present exemplary embodiment derives the compression level for compressing the normal information based on the specular reflection information, and compresses the normal information at the derived compression level. This enables reduction in the amount of reflection characteristic data while controlling degradation in the material appearance of the object represented by the reflection characteristic data. Hereinafter, the beneficial effects of the present exemplary embodiment will be described using a specific example. FIG. 13 illustrates results of rendering of normal information. An image 1301 is a result of rendering of uncompressed normal information in a case where the specular reflection intensity is entirely high. An image 1302 is a result of rendering of the uncompressed normal information in a case where the specular reflection intensity is entirely low. An image 1303 is a result of rendering of the normal information compressed at a compression level of 10 in a case where the specular reflection intensity is entirely high. An image 1304 is a result of rendering of the normal information compressed at a compression level of 10 in a case where the specular reflection intensity is entirely low. An image 1305 is a result of rendering of the normal information compressed at a compression level of two in a case where the specular reflection intensity is entirely high. An image 1306 is a result of rendering of the normal information compressed at a compression level of two in a case where the specular reflection intensity is entirely low. FIG. 14 illustrates compression rates at the respective compression levels in a case where the specular reflection intensity is entirely high and a case where the specular reflection intensity is entirely low.

The processing according to the present exemplary embodiment derives the compression level is derived so that a low compression is performed in a case where the specular reflection intensity is entirely high (the representative value is large). In other words, the result of rendering of the normal information in such a case is the image 1303. In a case where the specular reflection intensity is entirely low (the representative value is small), the compression level is derived so that high compression is performed. Thus, the result of rendering of the normal information in such a case is the image 1306. When the image 1303 and the image 1305 are compared, a degradation in the represented material appearance of the image 1305 is large. When the image 1304 and the image 1306 are compared, a difference in represented material appearance between the images 1304 and 1306 is small. From the above, according to the compression process of the present exemplary embodiment, it is possible to set a compression level at which a low degree of degradation in the represented material appearance is obtained. If there is no difference in the degree of degradation, the data amount can be reduced on a priority basis by performing high compression.

Modification Examples

In the present exemplary embodiment, the conversion table is used as data holding the correspondence relationship between the representative value of the specular reflection intensity and the compression level. Alternatively, data indicating a matrix or a function for use in conversion may be used.

In the present exemplary embodiment, the median value is derived as a representative value of the specular reflection intensity. Alternatively, an average value or the like may be derived.

According to an aspect of the embodiments, it is possible to reduce the amount of reflection characteristic data while controlling degradation in the material appearance of an object represented by reflection characteristic data.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)?), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-204919, filed Dec. 10, 2020, which is hereby incorporated by reference herein in its entirety.

What is claimed is:

1. An apparatus comprising:
   at least one processor; and
   a memory coupled to the at least one processor, the memory having instructions that, when executed by the processor, causes the at least one processor to function as:
   an acquisition unit configured to acquire normal information indicating a normal direction on a surface of an object and specular reflection information regarding reflection on the object in a specular reflection direction; and
   a compression unit configured to compress the normal information based on the specular reflection information,
   wherein the compression unit performs a higher compression process for a lower specular reflection intensity on the object.

2. The apparatus according to claim 1, wherein the compression unit performs a lower compression process for a sharper shape of a specular reflection component of reflection light from the object.

3. The apparatus according to claim 1, wherein the compression unit performs a higher compression process as more low frequency components are included in the normal information.

4. The apparatus according to claim 1, wherein the compression unit composites the normal information and a low-frequency component of the normal information to generate normal information for use in compression and compresses the normal information for use in compression.

5. The apparatus according to claim 4, wherein the at least one processor further functions as a determination unit configured to determine a composite ratio between the normal information and the low-frequency component of the normal information based on the specular reflection information,
    wherein the compression unit generates the normal information for use in compression based on the composite ratio.

6. The apparatus according to claim 1, wherein the at least one processor further functions as a determination unit configured to determine a compression level for compressing the normal information based on the specular reflection information,
    wherein the compression unit compresses the normal information based on the compression level.

7. The apparatus according to claim 6, wherein the determination unit determines the compression level for compressing the normal information by using data holding a correspondence relationship between a specular reflection intensity and the compression level.

8. The apparatus according to claim 1,
    wherein the specular reflection information indicates a two-dimensional distribution of a specular reflection intensity on the object, and
    wherein the normal information indicates a two-dimensional distribution of a normal vector on the object.

9. A method comprising:
acquiring normal information indicating a normal direction on a surface of an object and specular reflection information regarding reflection on the object in a specular reflection direction; and
compressing the normal information based on the specular reflection information,
    wherein a higher compression process is performed for a lower specular reflection intensity on the object.

10. The method according to claim 9, further comprising performing a lower compression process for a sharper shape of a specular reflection component of reflection light from the object.

11. The method according to claim 9, further comprising performing a higher compression process as more low frequency components are included in the normal information.

12. The method according to claim 9, further comprising generating normal information for use in compression and compresses the normal information for use in compression by using the normal information and a low-frequency component of the normal information.

13. A non-transitory computer-readable storage medium storing instructions that, when executed by a computer, cause the computer to perform a method, the method comprising:
acquiring normal information indicating a normal direction on a surface of an object and specular reflection information regarding reflection on the object in a specular reflection direction; and
compressing the normal information based on the specular reflection information,
    wherein a higher compression process is performed for a lower specular reflection intensity on the object.

14. The non-transitory computer-readable storage medium according to claim 13, further comprising performing a lower compression process for a sharper shape of a specular reflection component of reflection light from the object.

15. The non-transitory computer-readable storage medium according to claim 13, further comprising performing a higher compression process as more low frequency components are included in the normal information.

16. The non-transitory computer-readable storage medium according to claim 13, further comprising generating normal information for use in compression and compresses the normal information for use in compression by using the normal information and a low-frequency component of the normal information.

\* \* \* \* \*